J. A. JACOBS.
Stove Pipe Damper.

No. 56,566.

Patented July 24, 1866.

UNITED STATES PATENT OFFICE.

JOSEPH A. JACOBS, OF PITTSFIELD, NEW HAMPSHIRE.

STOVE-PIPE DAMPER.

Specification forming part of Letters Patent No. 56,566, dated July 24, 1866.

*To all whom it may concern:*

Be it known that I, JOSEPH A. JACOBS, of Pittsfield, Merrimack county, State of New Hampshire, have invented a new and Improved Heat Regulator and Damper; and I do hereby declare that the following is a full, clear, and exact description thereof, which will enable others skilled in the art to make and use the same, reference being had to the accompanying drawings, forming part of this specification, in which—

Figure 1:
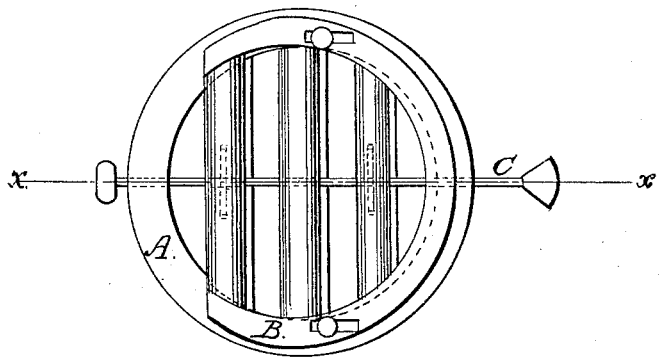
Figure 2:
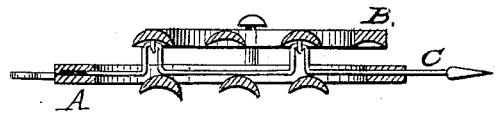

Figure 1 represents a plan or top view of this invention. Fig. 2 is a transverse section of the same, the line $x\,x$, Fig. 1, indicating the plane of section.

Similar letters of reference indicate like parts.

This invention relates to a regulator or damper which is made in the form of a double grate, the two parts of which are connected by a sliding crank-shaft in such a manner that by turning the crank-shaft the bars of the upper grate are raised above the surface of the bars of the lower grate, and the draft is merely checked; but by imparting to the crank-shaft a sliding motion the bars of the upper grate can be made to cover or uncover the openings between the bars of the lower grate, and the draft can be regulated with the greatest nicety.

A represents the lower or main grate, which connects with the top or secondary grate, B, by a crank-shaft, C, that has its bearings in suitable sockets in the main grate, and is so arranged that it can be rotated or moved in a longitudinal direction. The cross-section of the bars of the two grates is crescent-shaped, as shown.

This regulator is placed into the funnel or stove-pipe like an ordinary damper, the concave surface of the bars being next the fire. If little or no draft is required, the regulator is to be closed. The bars of the secondary grate are made to cover the openings between the bars of the main grate, thus turning the heated current of air back into the stove, but allowing the smoke sufficient egress to keep the fire alive without a draft to exhaust the fuel. If more draft is required the shaft C is turned, and thereby the top grate is raised and the passage of air is rendered a little more free, and at the same time all downward currents are cut off, and a main source of trouble in keeping up a fire is avoided. When still greater draft is needed the shaft C is made to slide, so that the bars of one grate will no longer cover the apertures of the other, thus leaving a free passage for the current of air, which may be increased by turning the regulator like an ordinary damper.

The advantages of my regulator are easily seen. It produces a saving of fuel, a more even temperature, no annoyance from smoke or down currents, and a certain means of keeping the fire going when needed.

What I claim as new, and desire to secure by Letters Patent, is—

A heat-regulator composed of two grates, A B, which are connected by sliding and revolving crank-shaft C, substantially as and for the purpose described.

JOSEPH A. JACOBS.

Witnesses:
 HENRY H. HUSE,
 JOHN E. MURPHY.